United States Patent
Tanno et al.

(10) Patent No.: US 7,629,724 B2
(45) Date of Patent: Dec. 8, 2009

(54) AXIAL AIR-GAP ELECTRONIC MOTOR

(75) Inventors: Toshiaki Tanno, Kawasaki (JP);
Tomonori Kojima, Kawasaki (JP)

(73) Assignee: Fujitsu General Limited,
Kawasaki-Shi, Kanagawa-Ken (JP)

( * ) Notice: Subject to any disclaimer, the term of this patent is extended or adjusted under 35 U.S.C. 154(b) by 248 days.

(21) Appl. No.: 11/284,935

(22) Filed: Nov. 23, 2005

(65) Prior Publication Data

US 2006/0113856 A1 Jun. 1, 2006

(30) Foreign Application Priority Data

Nov. 26, 2004 (JP) ............................. 2004-341905

(51) Int. Cl.
*H02K 1/22* (2006.01)

(52) U.S. Cl. .................. 310/268; 310/265; 310/156.32; 310/156.37; 310/156.13

(58) Field of Classification Search ................. 310/268, 310/265, 156.32–156.37, 156.05–156.07, 310/68 B, 156.13, 156.38
See application file for complete search history.

(56) References Cited

U.S. PATENT DOCUMENTS

| | | | | |
|---|---|---|---|---|
| 3,742,243 A | * | 6/1973 | Gamble | 307/106 |
| 4,086,519 A | * | 4/1978 | Persson | 318/254 |
| 4,329,636 A | * | 5/1982 | Uchida et al. | 318/721 |
| 4,455,516 A | * | 6/1984 | Furusho | 318/254 |
| 4,701,649 A | * | 10/1987 | Maemine | 310/68 R |
| 4,996,457 A | * | 2/1991 | Hawsey et al. | 310/268 |
| 5,218,251 A | * | 6/1993 | Allwine, Jr. | 310/49 R |
| 5,233,296 A | * | 8/1993 | Maeda et al. | 324/207.22 |
| 5,245,238 A | * | 9/1993 | Lynch et al. | 310/116 |
| 5,345,130 A | * | 9/1994 | Kliman et al. | 310/156.13 |
| 5,359,248 A | * | 10/1994 | Nagate et al. | 310/156.49 |
| 5,440,185 A | * | 8/1995 | Allwine, Jr. | 310/156.37 |
| 5,637,945 A | * | 6/1997 | Yamamuro et al. | 310/268 |
| 5,783,880 A | * | 7/1998 | Teshima et al. | 310/67 R |
| 5,939,809 A | * | 8/1999 | Mobius | 310/156.28 |
| 6,011,337 A | * | 1/2000 | Lin et al. | 310/156.37 |
| 6,445,105 B1 | * | 9/2002 | Kliman et al. | 310/268 |
| 6,476,528 B2 | * | 11/2002 | Sekine | 310/68 B |
| 6,657,328 B2 | * | 12/2003 | Shiga et al. | 310/26 |
| 6,762,527 B1 | * | 7/2004 | Horng | 310/156.18 |
| 2004/0164641 A1 | * | 8/2004 | Yamada et al. | 310/218 |
| 2006/0043821 A1 | * | 3/2006 | Kojima et al. | 310/268 |

FOREIGN PATENT DOCUMENTS

| | | | | |
|---|---|---|---|---|
| JP | 62213540 A | * | 9/1987 | |
| JP | 08130861 A | * | 5/1996 | |
| JP | 2005318718 A | * | 11/2005 | |

* cited by examiner

*Primary Examiner*—Quyen Leung
*Assistant Examiner*—Alex W Mok
(74) *Attorney, Agent, or Firm*—Manabu Kanesaka

(57) ABSTRACT

An axial air-gap electronic motor is arranged such that a teeth surface of a stator and a magnet surface of a rotor are arranged opposedly with a predetermined gap therebetween along an axis line direction of an output shaft of the rotor. The rotor has a rotor back yoke arranged coaxially with the stator, and a rotor magnet installed to the rotor back yoke so as to face the teeth surface of the stator. The rotor magnet is provided with an anchor magnet which is integral with the rotor magnet and is arranged on a back surface side of the rotor back yoke.

10 Claims, 6 Drawing Sheets

FIG. 6
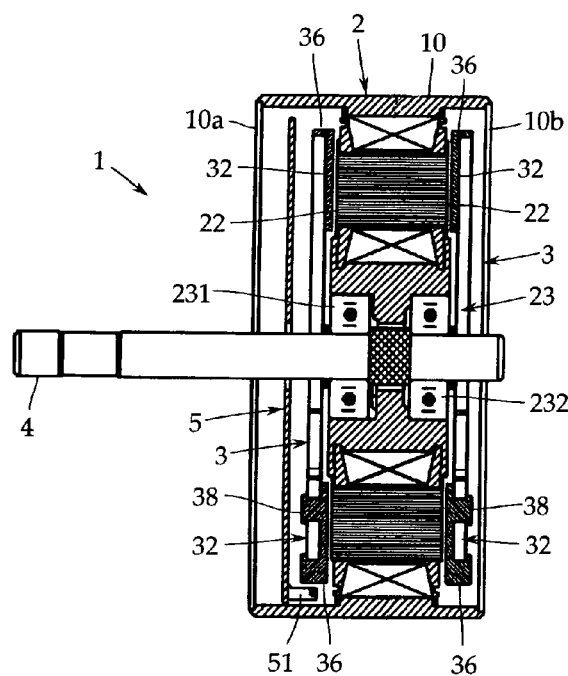
FIG. 7A          FIG. 7B          FIG. 7C
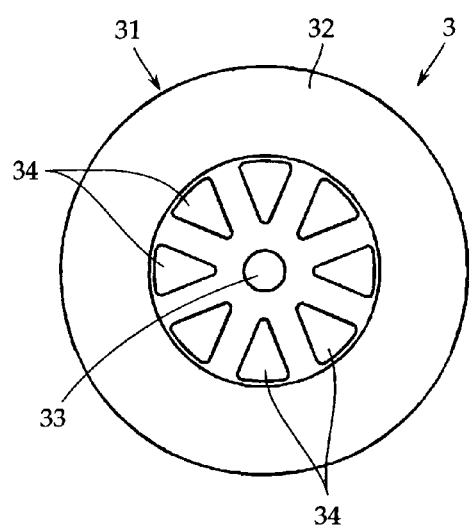 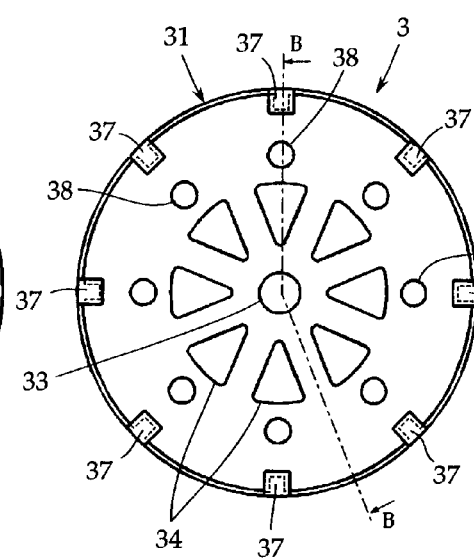 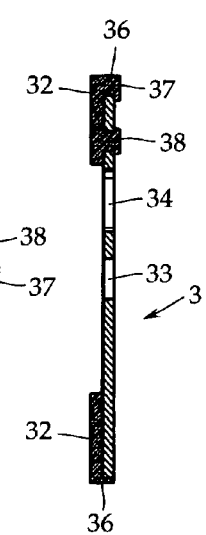

AXIAL AIR-GAP ELECTRONIC MOTOR

TECHNICAL FIELD

The present invention relates to an axial air-gap electronic motor in which a rotor and a stator are opposedly arranged along the axial direction of a rotor output shaft. More particularly, it relates to an axial air-gap electronic motor in which a rotor magnet can be fixed surely to a rotor back yoke.

BACKGROUND ART

For example, as shown in Patent Document 1 (Japanese Patent Application Publication No. H03-212141), an axial air-gap electronic motor is a motor in which a rotor is arranged oppositely on one side surface or both side surfaces of a stator with a predetermined gap being provided therebetween, and is characterized in that the thickness thereof in the rotating shaft direction can be decreased, namely, the motor can be made flat as compared with a radial air-gap electronic motor such as an inner rotor type.

Usually, the rotor consists of a rotor back yoke formed by a disc-shaped body and a rotor magnet attached integrally to the surface of the rotor back yoke, which faces the stator, and the rotor magnet is attached integrally to the rotor back yoke with an adhesive or the like.

Also, a brushless motor including the axial air-gap electronic motor is provided with rotation position detecting means for detecting the rotation position (rotation phase) thereof. As one example, in Patent Document 2 (Japanese Patent Application Publication No. S63-92250), a position detecting magnet is provided on the outer peripheral surface of the rotor, and also a position detecting sensor is provided around the rotor.

Also, as another method, Patent Document 2 has disclosed a technique in which the position detecting sensor is installed on the back surface side of the rotor back yoke to carry out position detection (sensing). Further, as still another method, Patent Document 3 (Japanese Patent Application Publication No. S62-189960) has proposed a brushless motor in which the position detecting sensor is arranged in the coil of the stator.

However, the conventional axial air-gap electronic motor has problems as described below. For the axial air-gap electronic motor, the rotor is attracted to the stator side by the magnetic attraction force of the coil at the time of operation. Therefore, if the rotor magnet is fixed merely by bonding as described in Patent Document 1, the rotor magnet may peel off. The rate of occurrence of this peeling-off phenomenon increases as the motor torque becomes high.

Also, in the method described in Patent Document 2, the magnet and attachment member used exclusively for position detection are required, so that not only the manufacturing cost increases accordingly but also the weight of the rotor itself increases because of the additional installation of the detecting magnet, thereby increasing electric power consumption.

Also, in the case where the position detecting sensor is installed on the back surface side of the rotor, a communication hole is formed to obtain a magnetic gap in a part of the rotor back yoke. In the hole forming process, the position of the communication hole varies easily, and also it is difficult to perform highly accurate sensing because the distance between the magnet and the position detecting sensor becomes long.

Further, in the case where the position detecting sensor is installed on the stator side as shown in Patent Document 3, there also arises a problem in that the position detecting sensor is easily affected by a magnetic field generated by the stator, so that exact position sensing cannot be performed.

SUMMARY OF THE INVENTION

Accordingly, the present invention has been made to solve the above problems, and an object thereof is to provide, at a low cost, an axial air-gap electronic motor capable of preventing a magnet from coming off and carrying out position detection more surely.

To achieve the above object, the present invention has some features as described below. First, in an axial air-gap electronic motor in which the teeth surface of a stator and the magnet surface of a rotor are arranged oppositely with a predetermined gap being provided therebetween along the axis line direction of the output shaft of the rotor, the rotor has a rotor back yoke arranged coaxially with the stator and a rotor magnet installed to the rotor back yoke so as to face the teeth surface of the stator, and the rotor magnet is provided with an anchor magnet which is integral with the rotor magnet and is arranged on the back surface side of the rotor back yoke.

According to this configuration, the anchor magnet formed integrally with the rotor magnet is provided on the back surface side of the rotor magnet, by which the coming-off of the rotor magnet can be prevented easily and surely.

The rotor magnet is formed of a moldable magnet material, and is integrally formed with the anchor magnet via a through hole passing through the rotor back yoke in the axial direction. Alternatively, the rotor magnet is integrally formed with the anchor magnet via the outer periphery of the rotor back yoke. Preferably, at the outer periphery of the rotor back yoke, a notch portion in which the anchor magnet is formed is provided.

According to this configuration, the rotor magnet and the anchor magnet are integrally molded in a part of the rotor back yoke via the through hole (or the outer periphery), by which the coming-off of the rotor magnet can be prevented surely by the magnetic attraction force.

Also, the through hole or the notch portion is preferably provided for each magnetic pole of the rotor magnet.

According to this configuration, the through hole or the notch portion is provided for each magnetic pole, by which a force applied to the rotor magnet can be distributed effectively, and the coming-off can be prevented more surely. Also, this configuration is suitable for sensing.

Further, it is preferable that the through hole be provided at least at two locations for each magnetic pole of the rotor magnet, and the anchor magnet be formed as one pattern so as to cover the through holes.

According to this configuration, two through holes are provided, and the anchor magnet is formed as one pattern so as to cover the through holes, by which not only the rotor magnet can surely be prevented from coming off but also highly accurate sensing can be performed.

A position detecting sensor for detecting the position of the rotor is further provided, and the position detecting sensor is provided at a position facing the rotation path of the anchor magnet.

According to the invention, the position detecting sensor is provided at a position facing the rotation path of the anchor magnet, by which the rotation position can be sensed surely and accurately by utilizing the anchor magnet that is a part of the rotor magnet.

It is preferable that the rotor magnet consists of a plurality of magnet members divided for each magnetic pole, and the magnet members be arranged in a ring shape with the rotation axis line being the center.

According to this configuration, the rotor magnet is arranged by being divided for each magnetic pole, by which a crack of the rotor magnet generated by a difference in linear expansion coefficient between the rotor back yoke and the rotor magnet can be prevented effectively.

Also, it is preferable that the stator consists of a plurality of core members divided for each teeth, and the core members be arranged in a ring shape with the rotation axis line being the center.

According to this configuration, the stator core is formed by arranging the plurality of core members in a ring shape with the rotation axis line being the center, by which the assembling work can be performed easily, and hence the motor can be manufactured at a lower cost.

Further, the rotor magnet is preferably polarized in the thrust direction. According this configuration, since the magnet is polarized in the vertical direction with respect to the back yoke surface, the orientation of magnet can be determined by scarcely being subject to the magnetic influence of the rotor back yoke surface. As a result, the magnet can be polarized surely.

The rotor magnet is preferably formed so that the thickness thereof is small at both ends in the rotation direction for each magnetic pole, and the thickness thereof in the central portion is larger than that at both ends in the circumferential direction. According to this configuration, by increasing the thickness in the central portion, the magnetic flux density waveform produced by the rotor magnet can be brought close to a sinusoidal wave, so that noise and vibration at the time of operation can be reduced.

BRIEF DESCRIPTION OF THE DRAWINGS

FIGS. 5A to 5D are front views showing various modifications of the

FIG. 6 is a longitudinal sectional view of an axial air-gap electronic motor in accordance with a second embodiment of the present invention;

FIG. 7A is a front view of a rotor of the axial air-gap electronic motor of the second embodiment shown in FIG. 6;

FIG. 7B is a back view of the rotor shown in FIG. 7A;

FIG. 7C is a sectional view taken along the line A-A of FIG. 7B;

DETAILED DESCRIPTION

Figure 1:
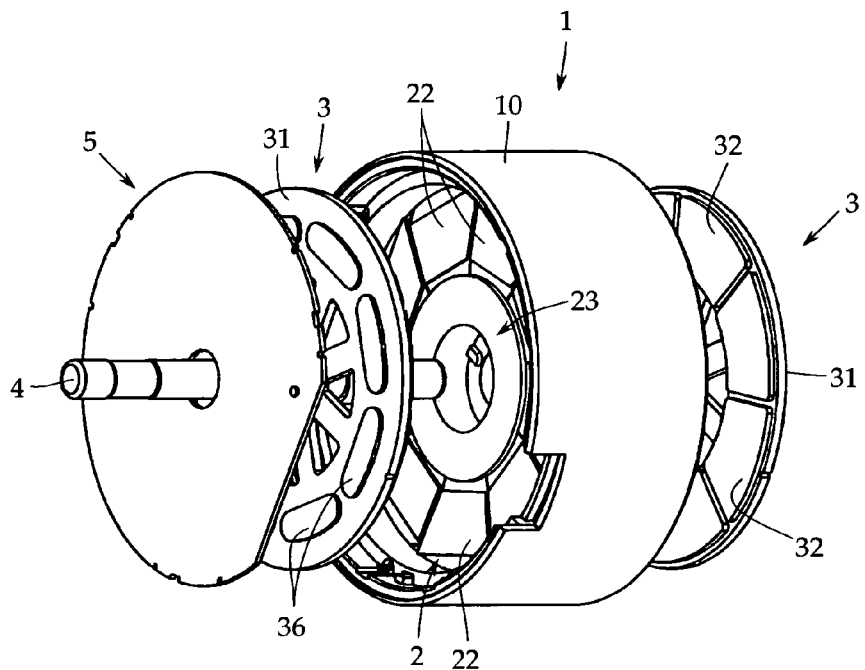
FIG. 1 is an exploded perspective view of an axial air-gap electronic motor in accordance with a first embodiment of the present invention.
Figure 2:
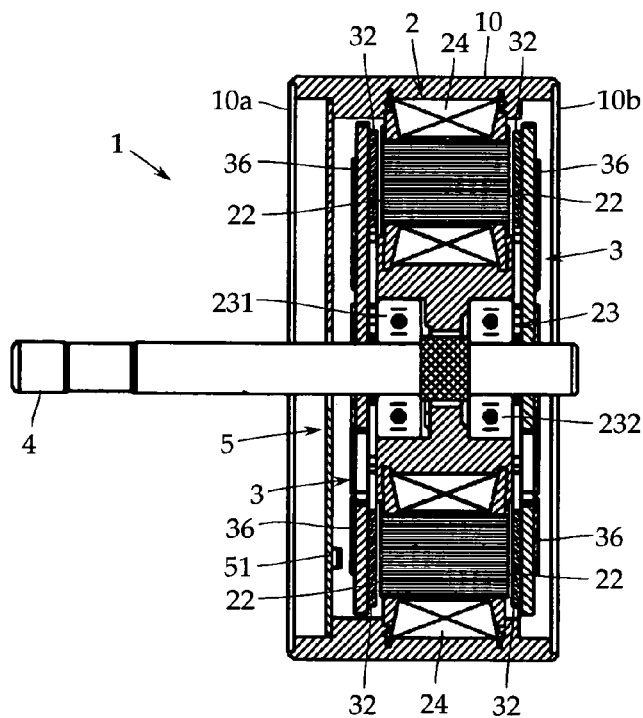
FIG. 2 is a longitudinal sectional view of the axial air-gap electronic motor of the first embodiment shown in FIG. 1.
Figure 3:
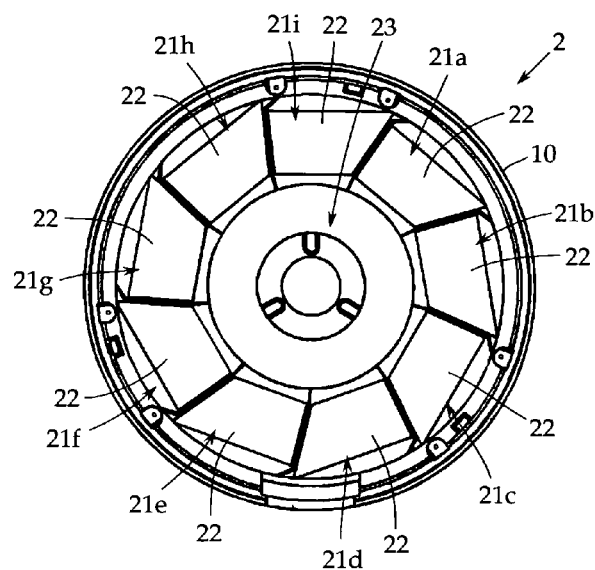
FIG. 3 is a front view of a stator of the axial air-gap electronic motor of the first embodiment shown in FIG. 1.
Figure 4A:
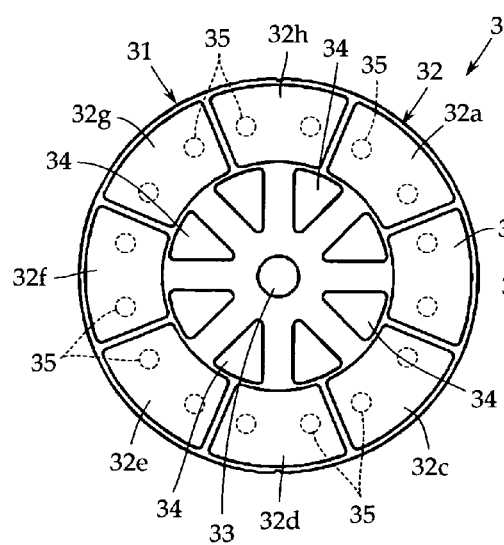
FIG. 4A is a front view of a rotor of the axial air-gap electronic motor of the first embodiment shown in FIG. 1.
Figure 4B:
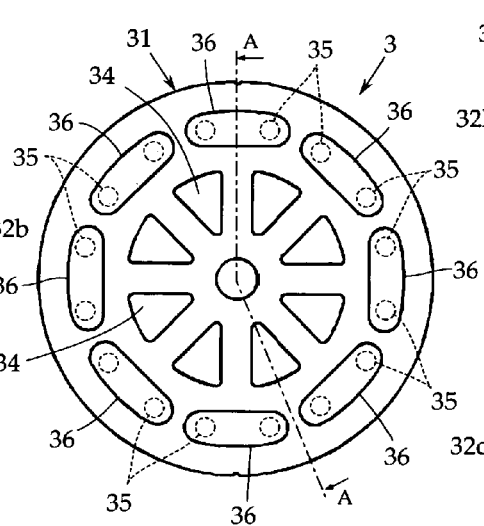
FIG. 4B is a back view of the rotor shown in FIG. 4A.
Figure 4C:
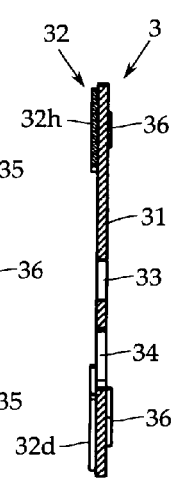
FIG. 4C is a sectional view taken along the line A-A of FIG. 4B.

Embodiments of the present invention will now be described with reference to the accompanying drawings. The present invention is not limited to these embodiments. FIG. 1 is an exploded perspective view of an axial air-gap electronic motor in accordance with a first embodiment of the present invention, and FIG. 2 is a central longitudinal sectional view of the first embodiment. FIG. 3 is a front view of a stator, and FIGS. 4A to 4C are a front view, a back view, and an A-A sectional view, respectively, of a rotor of the first embodiment.

This axial air-gap electronic motor 1 includes a stator 2 formed into a disc-shape and a pair of rotors 3 arranged oppositely on both side surfaces of the stator 2 with a predetermined gap being provided therebetween. The rotors 3 are fixed coaxially on a rotor output shaft 4 for developing a rotation driving force.

The stator 2 and the rotors 3 are housed in a cylindrical housing 10. In this example, at both ends of the housing 10, disc-shaped lid members 10a and 10b are provided as shown in FIG. 2, and therein is contained motor mechanism sections.

As shown in FIG. 3, the stator 2 includes a plurality of (nine in this example) pole members 21a to 21i arranged annularly with the rotation axis line being the center axis. Since each of the pole members 21a to 21i has the same construction, in this example, explanation is given by taking the pole member 21a as an example.

The pole member 21a is formed by winding a coil 24 (refer to FIG. 2) around a bobbin having a pair of, right and left, flange-shaped teeth surfaces 22, and the bobbin is formed by laminating magnetic steel sheets, each of which is formed into an H shape, along the radial direction.

Each of the pole members 21a to 21i is covered with an insulator (not shown), which is formed of an insulating resin, as a whole with the teeth surfaces 22 being left. This insulator is provided with connecting means, not shown, for connecting the pole members 21a to 21i to each other, so that the pole members 21a to 21i are connected in a ring shape via this connecting means.

The pole members 21a to 21i are connected in a ring shape with the axis line being the center by the connecting means, and thereafter are stiffened with a resin by insert molding, by which the stator 2 is assembled. In this example, the synthetic resin that fixes the outer periphery of the stator 2 also serves as the housing 10.

Referring again to FIG. 2, a bearing section 23 is arranged in a central portion of the stator 2. In this example, the bearing section 23 has a pair of radial ball bearings 231 and 232, the inner race thereof being press fitted on the rotor output shaft 4, and the outer race thereof being embedded by the synthetic resin material. In the present invention, the construction of the bearing section 23 may be arbitrary.

In this example, the rotors 3 have the same rotor output shaft 4 in common. However, a two output shaft type having a rotor output shaft for each rotor 3 may be used. Further, a shaft-less type may be used in which the rotors 3 are supported directly on the stator 2 via a radial ball bearing without using the rotor output shaft 4.

Next, the rotors 3 are explained. Since each of the rotors 3 has the same construction, in this example, explanation is given by taking one of the rotors 3 as an example. In this example, the surface on the side facing the teeth surface 22 of the stator 2 is called the front surface of the rotor 3.

As shown in FIG. 4A, the rotor 3 is made up of a rotor back yoke 31 consisting of a disc body arranged coaxially with the stator 2 and a rotor magnet installed integrally with the rotor back yoke 31.

In this example, the rotor magnet 32 is formed of a moldable magnet material (for example, Sm—Fe—Ne based bonded magnet) so as to be divided into eight segments. It is preferable that the rotor magnet 32 be polarized in the thrust direction. However, it may be polarized so as to have pole anisotropy.

The rotor back yoke 31 is formed of a magnetic material such as an electrolytic zinc-coated carbon steel sheet, and is provided with a shaft fixing hole 33, which is press fixed on the rotor output shaft 4, at the center. Further, the rotor back yoke 31 is provided with a plurality of punched holes 34, which are arranged annularly with the shaft fixing hole 33 being the center, to reduce the weight of the rotor back yoke 31 and to improve the vibration-proofing properties.

In this example, the number of the punched holes 34 is eight, and each of the punched holes 34 is formed into a fan shape. However, the punched hole 34 may take any shape other than the fan shape, and the size and the number thereof can be changed arbitrarily according to the specifications of the motor.

The rotor back yoke 31 is provided with through holes 35 for integrally fixing the rotor magnet 32. Each of the through holes 35 is a hole passing through the rotor back yoke 31 in the axial direction (the direction perpendicular to the paper surface in FIG. 4A), and the through holes 35 are arranged annularly with the axis line of the rotor output shaft 4 being the center. In this example, a total of sixteen through holes 35 are provided in such a manner that two through holes form a set for each segment of the rotor magnet 32 to prevent the rotation of each segment.

The shaft fixing hole 33 and the punched holes 34 can also be used as guide holes in a mold of an insert molding machine when the rotor magnet 32 is insert molded. Specifically, first, the center position is fixed by utilizing the shaft fixing hole 33 at the center, and then the punched holes 34 are fitted on guide ribs provided in the mold, by which the circumferential positioning is performed, so that the positioning can be performed surely. Further, if the through holes 35 are arranged so as to match the gate position of mold, the resin can spread smoothly in the mold, so that the molding work can be performed more easily.

The rotor magnet 32 is made up of magnet members 32a to 32h of eight segments as described above. Since each of the magnet members 32a to 32h has the same construction, explanation is given by taking one magnet member 32a as an example.

The magnet member 32a is formed substantially into a fan shape having a magnet surface parallel to the teeth surface 22 of the stator 2. The magnet member 32a is formed integrally with the rotor back yoke 31 by what is called an insert molding technique in which the rotor back yoke 31 is put into a predetermined mold and a resin is poured into the mold.

As shown in FIG. 4B, on the back surface side of the rotor back yoke 31, an anchor magnet 36, which is integral with the magnet member 32a via the through holes 35, is formed. The anchor magnet 36 is formed into an elliptical shape as one pattern so as to cover the through holes 35. The anchor magnet 36 is formed at eight locations in total for each segment of the rotor magnet 32a to 32h.

The anchor magnet 36 plays both of a role in preventing the magnet member 32a from coming off at the time of operation and a role as a detecting magnet serving as a detected portion of a position detecting sensor 51 mounted on a circuit board 5, described later.

Figure 5A:
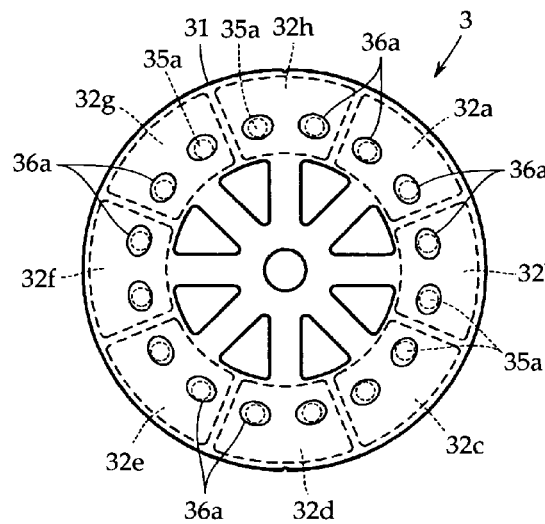

In this example, the anchor magnet 36 is formed as one pattern so as to cover the two through holes 35. However, for example, as shown in FIG. 5A, one anchor magnet 36a may be formed for one through hole 35a. By doing this as well, the magnet member 32a can surely be prevented from coming off. In this case, to prevent the rotation of each segment, the shape of the through hole 35 is preferably elliptical or polygonal.

Figure 5B:
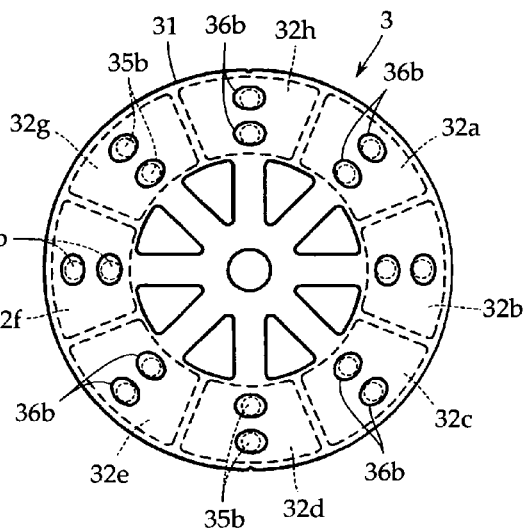

Also, in this example, the through holes 35a, 35 are provided in the circumferential direction. However, as shown in FIG. 5B, the through holes 35b may be provided in the radial direction, and anchor magnets 36b may be provided there. Further, the anchor magnet 36b may be formed so as to cover a portion between the through holes 35b as shown in FIG. 4B.

In this example, the through holes 35b are provided at two locations along the circumferential direction (FIG. 4 and FIG. 5A) or along the radial direction (FIG. 5B). However, more through holes 35a, 35b may be provided. Specifically, as shown in FIG. 5C, the rotor back yoke 31 is provided with three through holes 35c to 35e for one segment, and an anchor magnet 36c is formed for each of the through holes 35c to 35e.

In this example, the through holes 35c to 35e are arranged so as to connect vertexes of a regular triangle, and these sets of through holes 35c to 35e in each segment are arranged annularly. In this example, the anchor magnet 36c is formed for each of the through holes 35c to 35e. However, as shown in FIG. 5D, an anchor magnet 36d may be formed independently for one through hole 35c, and an anchor magnet 36e of one pattern may be formed so as to cover the remaining through holes 35d and 35e. According to this configuration, the magnet member can be fixed more firmly. In addition, if the anchor magnet 36e on the outer periphery side is utilized for detecting position, the influence (ratio) of detection error with respect to variations caused by part accuracy etc. can be reduced, so that stable position detection can be carried out.

Figure 5C:
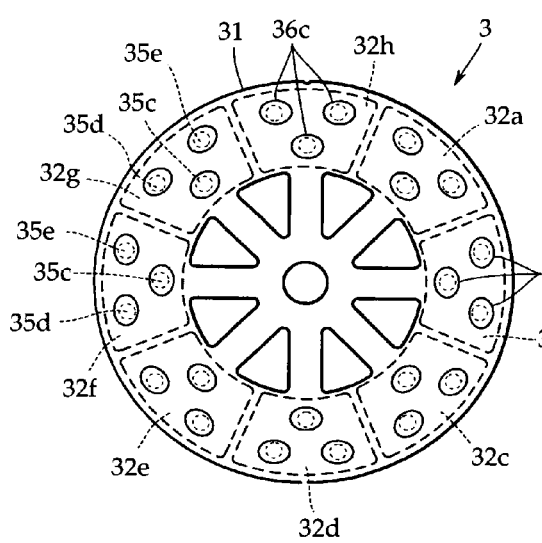
Figure 5D:
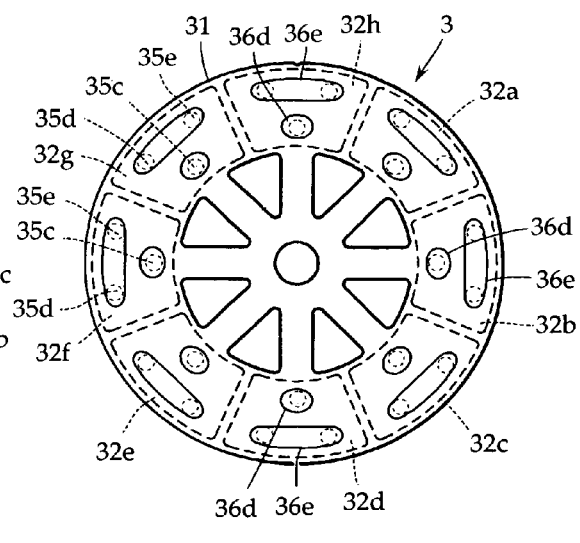

As shown in FIGS. 5A and 5C, in the case where the anchor magnet 36a, 36c is provided independently, even-numbered or odd-numbered anchor magnet 36a, 36c has only to be specified and to be detected by the position detecting sensor 51.

That is to say, for the adjacent anchor magnets of the same pole, the same pole is detected. Since a place where magnet is absent therebetween is neglected, position detection for each pole can be carried out. However, in the case where strong magnets are used, a place between the magnets may be judged to be a different pole, so that the place should preferably be formed so as to be covered integrally.

Referring again to FIGS. 1 and 2, on the anti-stator side of one rotor 3 (left-hand side in FIG. 2), there is arranged the circuit board 5 for controlling the operation of the axial air-gap electronic motor 1. The circuit board 5 consists of a disc body inserted along the inside diameter of the housing 10, and on the mounting surface thereof, various electronic parts (not shown) are mounted.

As shown in FIG. 2, on the surface facing the rotor 3 of the circuit board 5, the position detecting sensor 51 for detecting the rotation position of the rotor 3 is mounted. The position detecting sensor 51 consists of a sensor for detecting magnetic variations, such as a Hall sensor, and is arranged relatively on the rotation path of the anchor magnet 36 of the rotor 3.

According to this configuration, not only the rotation of the rotor 3 can be detected easily but also the rotation position of the rotor 3 can be detected immediately from the anchor magnets 36 installed on the rotor 3, so that more accurate position detection can be carried out.

Next, an axial air-gap electronic motor in accordance with a second embodiment of the present invention will be described. In the explanation below, the same reference characters are applied to elements that are the same or regarded as the same as those in the first embodiment, and the explanation thereof is omitted.

In the second embodiment, since the stator of the axial air-gap electronic motor 1a is the same as that in the above-described first embodiment, only a rotor is shown. FIG. 6 is a sectional view of an axial air-gap electronic motor in accordance with the second embodiment of the present invention, and FIGS. 7A to 7C are a front view, a back view, and a B-B sectional view, respectively, of a rotor of the second embodiment.

As shown in FIG. 7A, the rotor magnet 32 of the second embodiment is formed into a doughnut shape integrally with one surface (the near side of paper surface in FIG. 7A) of the rotor back yoke 31. The rotor magnet 32 may be formed so as to be divided into segments as in the first embodiment.

The rotor 3 of the second embodiment has the rotor back yoke 31 formed into a disc shape and the rotor magnet 32 installed integrally with the rotor back yoke 31, and the rotor magnet 32 is fixed so that a part thereof is exposed to the outer periphery side of the rotor back yoke 31.

In the second embodiment as well, as shown in FIG. 7B, the rotor back yoke 31 is provided with the shaft fixing hole 33 at the center thereof, and the plurality of punched holes 34 are arranged annularly at the outer periphery of the shaft fixing hole 33. Further, at the outer periphery of the punched holes 34, the plurality of through holes 35 are arranged annularly at predetermined intervals.

The rotor back yoke 31 is further formed with eight notch grooves 37 at 45° intervals at the outer peripheral edge thereof. As shown in FIG. 7C, the notch groove 37 consists of a concave groove formed from the outer peripheral edge of the rotor back yoke 31 toward the center thereof.

In this example, a part of the rotor magnet 32 is provided with an anchor magnet 36 formed from the side surface side of the rotor back yoke 31 to the back surface side thereof (the near side of paper surface in FIG. 7B) via the notch groove 37 of the rotor back yoke 31 and a second anchor magnet 38 formed through the through hole 35.

Coupled with the anchor magnet 36, the position detecting sensor 51 of the circuit board 5 is arranged, as shown in FIG. 6, on the outer periphery side of the rotor 3, namely, on the outer periphery side facing the anchor magnet 36. According to this configuration, the position detection can be carried out while the rotor magnet 32 is prevented, via the notch portion, from moving in the radial direction and the circumferential direction.

Figure 8:
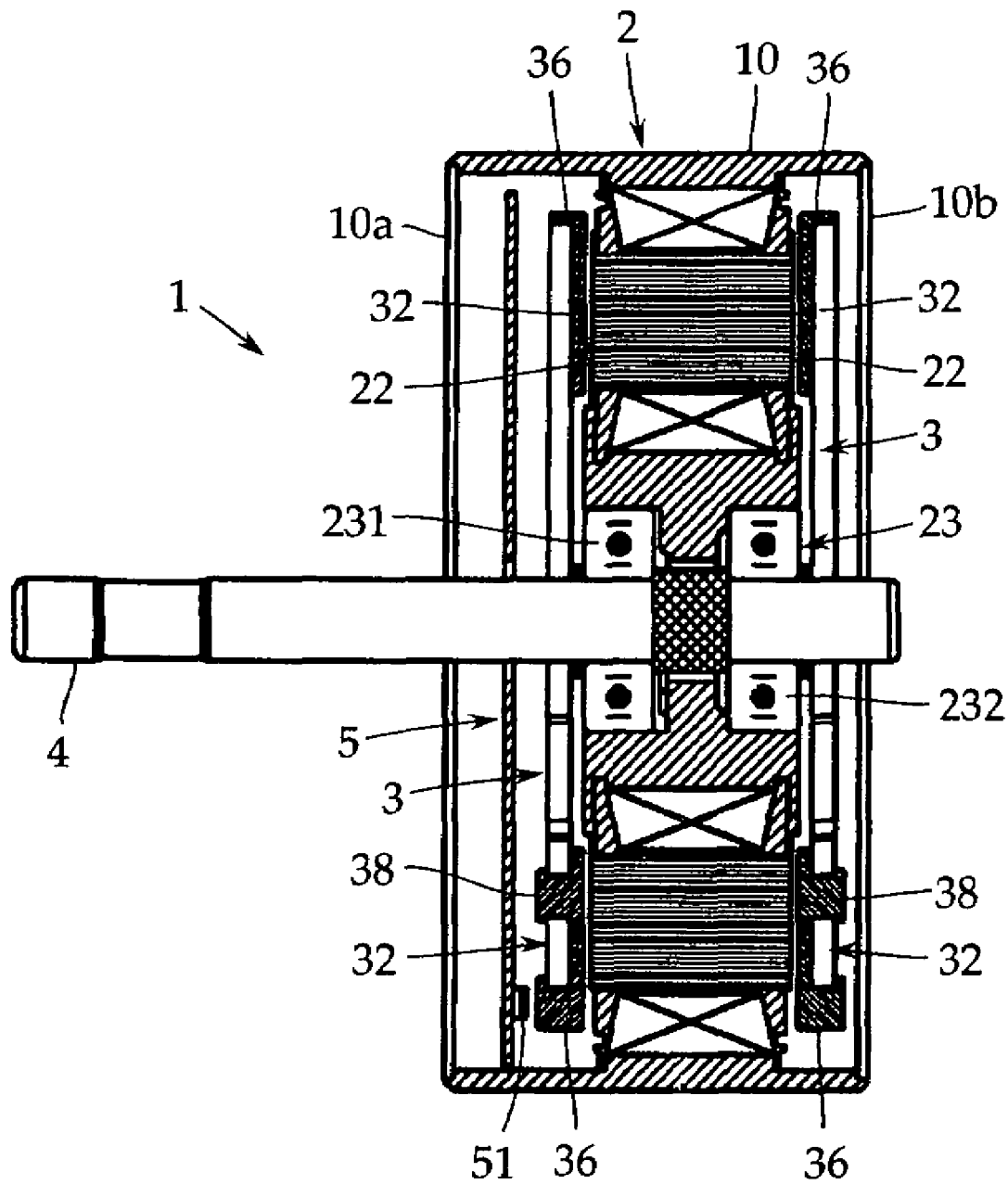
FIG. 8 is a longitudinal sectional view showing a modification of the second embodiment.

In this second embodiment, the position detecting sensor 51 is provided on the outer periphery side. However, for example, as shown in FIG. 8, the position detecting sensor 51 may be provided at a position facing the back surface side (anti-stator side) of the rotor 3 of the anchor magnet 36 as in the first embodiment.

Further, as another method, the position detecting sensor may be provided at a position facing the second anchor magnet 38. According to this method, a plurality of circuit patterns of circuit board can be prepared, so that the detection position can be changed arbitrarily according to the specifications of the motor.

Figure 9A:
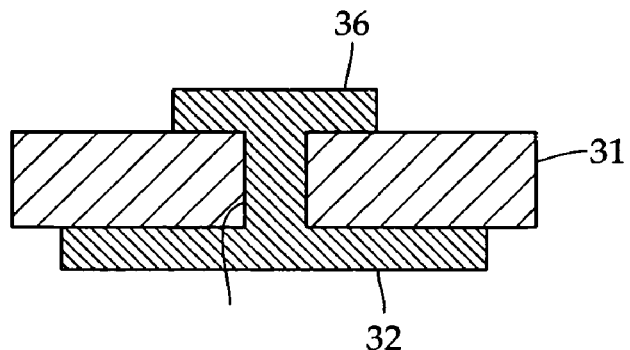
FIGS. 9A to 9E are explanatory views illustrating various modifications of a rotor magnet.
Figure 9B:
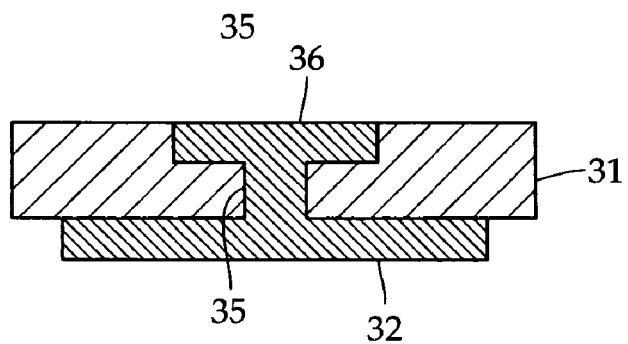

In the above-described embodiment, as shown in FIG. 9A, the rotor magnet 32 and the anchor magnet 36 are connected to each other via the through hole 35 (or the notch groove 37), and both of them are flat bodies having a fixed thickness. However, as shown in FIG. 9B, the anchor magnet 36 may be embedded on the rotor back yoke 31 side. According to this configuration, the whole of the rotor 3 can be formed into a thinner shape.

Further, as a preferred mode, it is desirable that the rotor magnet 32 be formed so that the thickness of the outside in the circumferential direction is small and the thickness of the central portion is large. The purpose for this is that the magnetic flux density waveform produced by the rotor magnet is brought close to a sinusoidal wave to reduce noise and vibration at the time of operation.

Figure 9C:
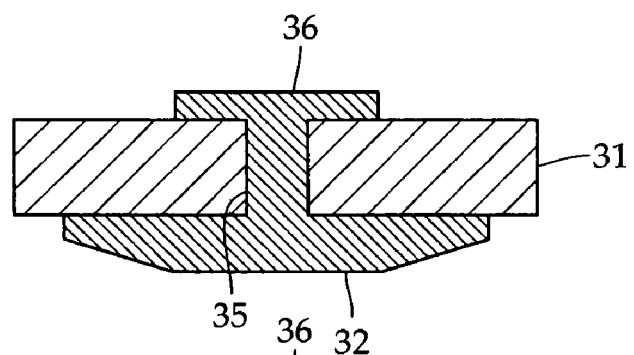
Figure 9D:
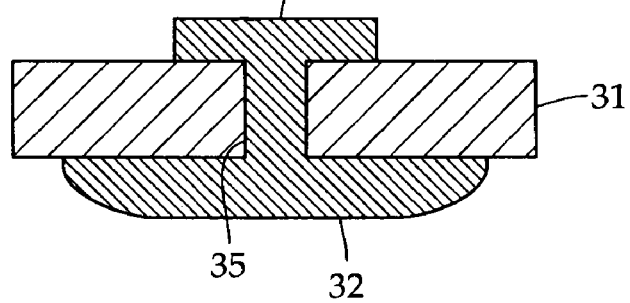

Specifically, as shown in FIG. 9C, a taper surface may be formed on both end sides of the rotor magnet 32 to increase the thickness on the center side. Also, as another method, as shown in FIG. 9D, the taper surface may be formed into an arc shape.

Figure 9E:
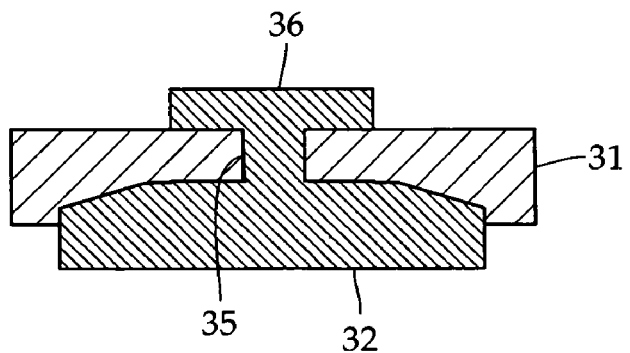

Further, as another mode, as shown in FIG. 9E, the configuration may be such that the rotor back yoke 31 is formed with a concave portion, and the rotor magnet 32 is embedded in the concave portion. At this time, the thickness at both ends may be made small and the central portion may be made large by forming a taper surface at both ends of the concave portion.

In the above-described embodiment, the anchor magnet 36 is formed into a round shape or an elliptical shape. However, the shape and size and the number etc. of the anchor magnet 36 can be changed arbitrarily according to the specifications of the motor if the configuration is such that a part of the rotor magnet 32 is exposed on the back surface side (or the side surface side) by utilizing the through hole 35.

Also, in the above-described embodiments, there is used the axial air-gap electronic motor having a configuration in which the teeth surface of stator has nine slots and the number of rotor poles is eight, which is highly efficient in reducing cogging torque. However, a slot and pole configuration other than the above may be applied to an electronic motor having a basic axial air-gap type construction.

The present application is based on, and claims priority from, Japanese Application Serial Number JP2004-341905, filed Nov. 26, 2004, the disclosure of which is hereby incorporated by reference herein in its entirety.

The invention claimed is:

1. An axial air-gap electronic motor in which a teeth surface of a stator and a magnet surface of a rotor are arranged oppositely with a predetermined gap being provided therebetween along an axis line direction of an output shaft of the rotor, wherein
the rotor has a rotor back yoke arranged coaxially with the stator and having a through hole or a notch portion at an outer periphery thereof, and a rotor magnet formed of a moldable magnet material and installed to the rotor back yoke so as to face the teeth surface of the stator,
the rotor magnet is provided with an anchor magnet which is integrally molded with the rotor magnet through the through hole or the notch portion and is arranged on a back surface side of the rotor back yoke, and
the anchor magnet covers the through hole or the notch portion to prevent the rotor magnet from being removed from the rotor back yoke.

2. The axial air-gap electronic motor according to claim 1, wherein the through hole is provided at least at two locations for each magnetic pole of the rotor magnet, and the anchor magnet is formed as one continuous pattern so as to cover the through holes.

3. The axial air-gap electronic motor according to claim 1, wherein a position detecting sensor for detecting a position of the rotor is further provided, and the position detecting sensor is provided at a position facing a rotation path of the anchor magnet.

4. The axial air-gap electronic motor according to claim 1, wherein the stator comprises a plurality of core members divided for each teeth, and the core members are arranged in a ring shape with a rotation axis line of the rotor being a center.

5. The axial air-gap electronic motor according to claim 1, wherein the rotor magnet is polarized in a thrust direction.

6. The axial air-gap electronic motor according to claim 1, wherein the rotor magnet is formed so that a thickness thereof is small at both ends in a rotation direction for each magnetic pole, and the thickness thereof in a central portion is larger than that at both ends in the rotational direction.

7. An axial air-gap electronic motor in which a teeth surface of a stator and a magnet surface of a rotor are arranged opposedly with a predetermined gap being provided therebetween along an axis line direction of an output shaft of the rotor, wherein
   the rotor has a rotor back yoke arranged coaxially with the stator and having a through hole or a notch portion at an outer periphery thereof, and a rotor magnet formed of a moldable magnet material and installed to the rotor back yoke so as to face the teeth surface of the stator,
   the rotor magnet is provided with an anchor magnet which is integrally molded with the rotor magnet through the through hole or the notch portion and is arranged on a back surface side of the rotor back yoke,
   the anchor magnet covers the through hole or the notch portion to prevent the rotor magnet from being removed from the rotor back yoke, and
   the rotor magnet comprises a plurality of magnet members divided for each magnetic pole, and the magnet members are arranged in a ring shape with a rotation axis line of the rotor being a center.

8. The axial air-gap electronic motor according to claim 7, wherein the anchor magnet comprises a plurality of anchor magnet sections arranged in a ring shape around the rotational axis line.

9. The axial air-gap electronic motor according to claim 8, wherein the rotor back yoke includes two through holes for each of the magnet members of the rotor magnet, and each of the anchor magnet sections is greater in size than the through hole.

10. The axial air-gap electronic motor according to claim 9, wherein one of the anchor magnet sections connects said two through holes at a side opposite to the magnet member.

* * * * *